(12) United States Patent
Fletcher

(10) Patent No.: US 9,493,170 B2
(45) Date of Patent: Nov. 15, 2016

(54) METHOD FOR REDUCING FALSE ACTIVATIONS IN REVERSE COLLISION AVOIDANCE SYSTEMS

(71) Applicant: Continental Automotive Systems, Inc., Auburn Hills, MI (US)

(72) Inventor: Graham Lanier Fletcher, North Augusta, SC (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/603,508

(22) Filed: Jan. 23, 2015

(65) Prior Publication Data

US 2015/0210293 A1    Jul. 30, 2015

Related U.S. Application Data

(60) Provisional application No. 61/933,096, filed on Jan. 29, 2014.

(51) Int. Cl.
*G06F 17/10* (2006.01)
*B60W 50/14* (2012.01)
(Continued)

(52) U.S. Cl.
CPC .......... *B60W 50/14* (2013.01); *B60W 30/0956* (2013.01); *G06K 9/00805* (2013.01); *B60W 2050/146* (2013.01); *B60W 2550/10* (2013.01)

(58) Field of Classification Search
USPC ......................................................... 701/301
See application file for complete search history.

(56) References Cited

U.S. PATENT DOCUMENTS 6,445,983 B1 * 9/2002 Dickson ............... A01B 69/008
701/23
6,502,033 B1 * 12/2002 Phuyal ................... G01C 21/30
340/988

(Continued)

FOREIGN PATENT DOCUMENTS

CN    1359093 A    7/2002
CN    1704719 A    12/2005
(Continued)

OTHER PUBLICATIONS

Hadj Hamma Tadjine et al—"Object Detection and Classification Using a Rear In-Vehicle Fisheye Camera", Proceedings of the Fisita 2012 World Automotive Congress, Nov. 27, 2012. XP055195619 (abstract, section 1-2, paragrafph [0001], section 8 and 11).
(Continued)

*Primary Examiner* — Hussein A. Elchanti

(57) ABSTRACT

A collision avoidance system for a vehicle is disclosed that includes at least one sensor mounted to a vehicle to measure the vehicle's environment in the reverse driving direction, a controller which creates a feature vector based on relationships among data provided by at least one sensor, and a non-volatile memory which stores feature vectors and related object configurations for a number of different environments. The system utilizes a comparison between the current feature vector and previously stored feature vectors to match the current environment with a previously observed environment, and then loads a previously stored object configuration which can improve collision detection performance to reduce the number of unnecessary system interventions.

15 Claims, 2 Drawing Sheets

(51) Int. Cl.
*B60W 30/095* (2012.01)
*G06K 9/00* (2006.01)

(56) References Cited

U.S. PATENT DOCUMENTS

| | | | |
|---|---|---|---|
| 6,853,906 B1* | 2/2005 | Michi | B60K 31/0008 701/410 |
| 7,211,980 B1* | 5/2007 | Bruemmer | G05D 1/0214 318/567 |
| 7,552,008 B2* | 6/2009 | Newstrom | G06F 17/30241 340/988 |
| 2007/0219720 A1* | 9/2007 | Trepagnier | B60W 30/00 701/300 |
| 2008/0039991 A1* | 2/2008 | May | G05D 1/024 701/25 |
| 2008/0085686 A1* | 4/2008 | Kalik | G01S 13/931 455/154.1 |
| 2008/0208455 A1* | 8/2008 | Hartman | G01S 17/023 701/408 |
| 2011/0040481 A1 | 2/2011 | Trombley et al. | |

FOREIGN PATENT DOCUMENTS

| | | |
|---|---|---|
| CN | 1782665 A | 12/2010 |
| JP | 2010072947 A | 4/2010 |

OTHER PUBLICATIONS

Anonymous—"Object Detection—MATLAB", Jan. 17, 2014, XP055195617.
Ang Yew-Hock et al—"Image Information Retrieval Systems"—in: "Handbook of Pattern Recognition and Computer Vision", Jan. 1, 1993. World Scientific Publishing, XP055195621, ISBN: 978-9-81-022276-5 p. 726 (section 3.1.4).
Search Report dated Jun. 29, 2015, from corresponding European Application No. 1515297.9.
Japanese Office Action dated Feb. 8, 2016.

* cited by examiner

METHOD FOR REDUCING FALSE ACTIVATIONS IN REVERSE COLLISION AVOIDANCE SYSTEMS

CROSS REFERENCE TO RELATED APPLICATION

This application claims priority to U.S. Provisional Application No. 61/933,096 filed on Jan. 29, 2014.

TECHNICAL FIELD

The present disclosure relates to automotive vehicles, and more particularly to driver assistance systems for automotive vehicles.

BACKGROUND

Advancements in sensor technology available have led to the ability to improve safety systems for vehicles. Arrangements and methods for detecting and avoiding collisions are becoming available. Such driver assistance systems use sensors located on the vehicle to detect an impending collision. The systems may warn the driver of various driving situations to prevent or mitigate collisions. Additionally, sensors and cameras are used to alert the driver of possible obstacles when the vehicle is traveling in reverse.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An example disclosed collision avoidance system for a vehicle includes at least one sensor mounted to a vehicle to measure the vehicle's environment in the reverse driving direction, a controller which creates a feature vector based on relationships among data provided by at least one sensor, and a non-volatile memory which stores feature vectors and related object configurations for a number of different environments. The system utilizes a comparison between the current feature vector and previously stored feature vectors to match the current environment with a previously observed environment, and then loads a previously stored object configuration that can improve collision detection performance by modifying a probability that an object is or is not an obstacle within the vehicle path. The improved identification of commonly encountered objects reduces intrusion to vehicle occupants by avoiding unnecessary braking interventions from the collision avoidance system.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The present disclosure will become more fully understood from the detailed description and the accompanying drawings, wherein.

DETAILED DESCRIPTION

Figure 1:
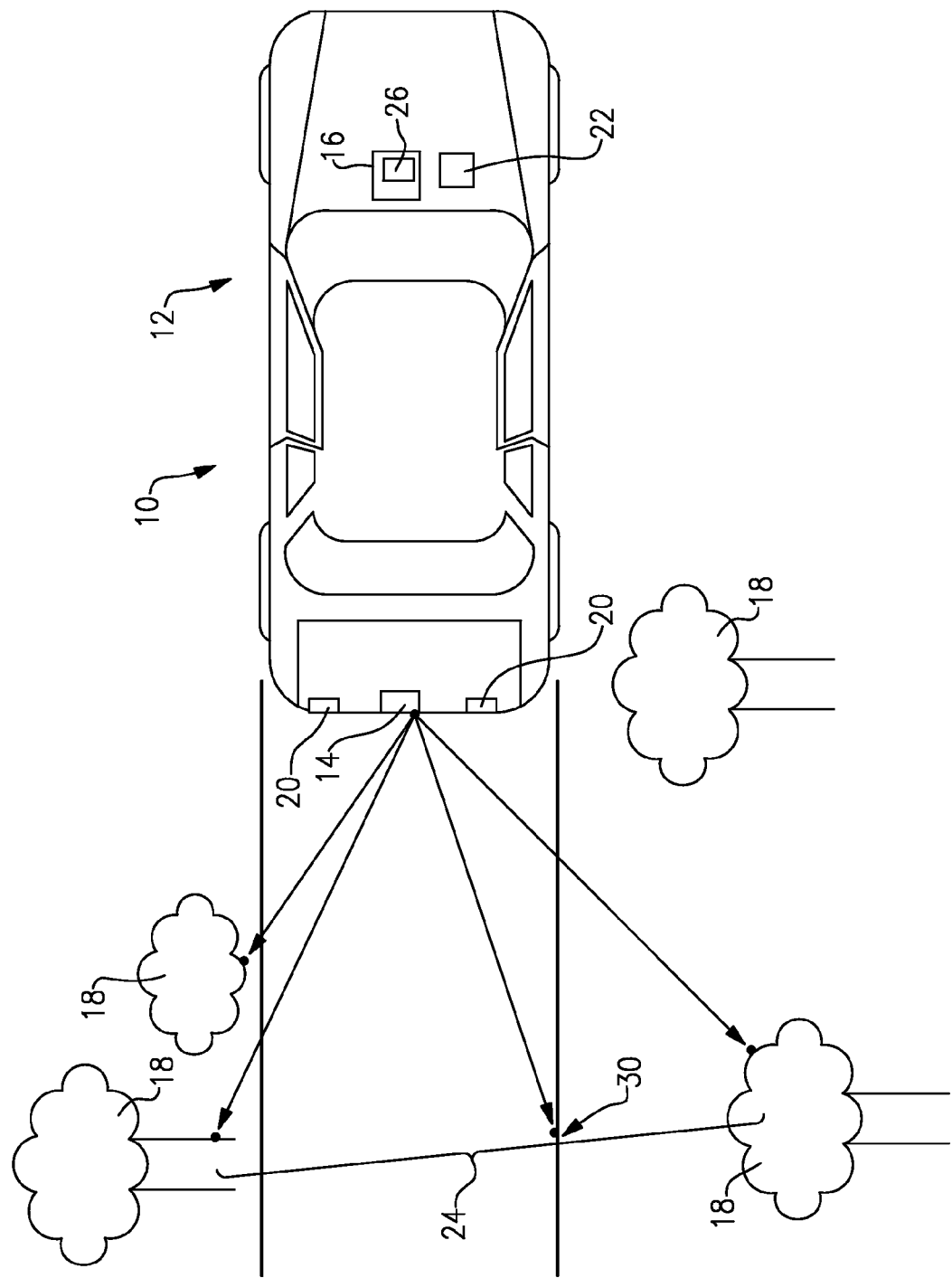
FIG. 1 is a schematic illustration of a top view of a vehicle utilizing a reverse collision avoidance system of the present invention.

The following description is merely exemplary in nature and is in no way intended to limit the disclosure, its application, or uses. For purposes of clarity, the same reference numbers will be used in the drawings to identify similar elements.

FIG. 1 illustrates a vehicle 10 and a driver assistance system, in particular a reverse collision avoidance system 12. The reverse collision avoidance system 12 includes a camera 14 mounted to provide a view of the reverse driving direction for the vehicle 10. The camera 14 may be a monocular camera, binocular camera, or another type of sensing device capable of providing a view of the reverse driving path of the vehicle 10. The camera 14 may be mounted in any location that provides a view of the reverse driving path of the vehicle 10. Moreover, although a camera 14 is described by way of example, other sensors that provide information indicative of a position of the vehicle and of objects proximate to the vehicle can be utilized and are within the contemplation of this disclosure.

Throughout the application the relative forward and reverse directions are in reference to the direction in which an operator for the vehicle 10 would primarily be facing when operating the vehicle 10.

A controller 16 may be connected to the camera 14 to analyze the image data and identify objects 18 that may be obstacles for the vehicle 10. In addition to the camera 14 the collision avoidance system 12 may use other systems and sensors to assist in identifying objects 18. Such systems and sensors may include, but are not limited to: proximity sensors 20, LIDAR, radar, ultrasonic sensors, GPS 22, radio sensors, or other sensors known in the art to be capable of detecting the position of an obstacle relative to the vehicle 10.

As soon as the vehicle 10 is started and shifted into reverse, the reverse collision avoidance system 12 is started. The reverse collision avoidance system 12 uses information from the camera 14 and sensor 20 to produce a characteristic feature vector 24 comprising relationships between the vehicle 10 and the environment and relationships among detected objects 18 in the environment. The characteristic feature vector 24 is used to uniquely identify the environment in which the vehicle 10 is operating. The characteristic feature vector 24 may be constructed in-part through the use of an illumination- and scale-invariant image descriptor which is applied to the image data transmitted by the camera 14. In addition to low-level, sensor-dependent features, the feature vector 24 might include higher-level features, such as the spatial distribution of objects such as trees, shrubs, mailboxes, landscaping features, driveway or parking area features 30, buildings, etc. that are proximate to the vehicle 10. The vehicle 10 location may also be included in the characteristic feature vector 24 when GPS 22 is available. The dimensionality and composition of the feature space can be calibrated according to which measurable properties prove most robust given the available sensor information.

Figure 2:
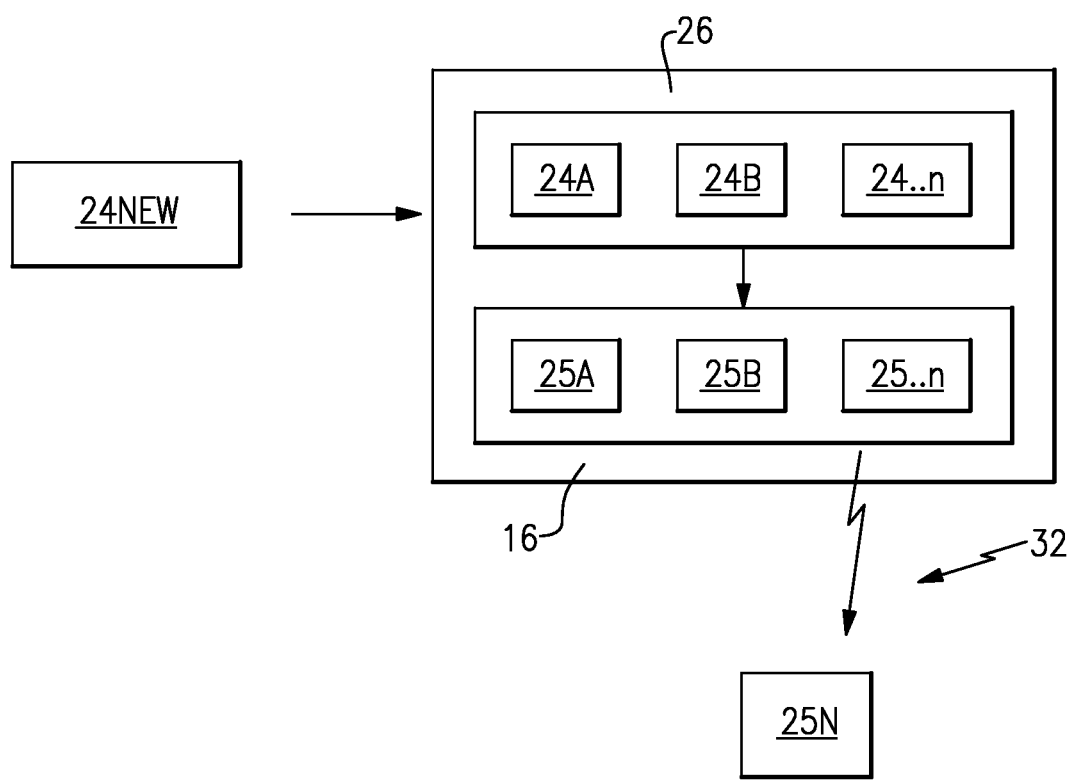
FIG. 2 is a schematic illustration of an example controller and memory.

Referring to FIG. 2 with continued reference to FIG. 1, a new feature vector $24_{new}$ is created each time the vehicle 10 is placed in reverse gear. The controller 16 first attempts to classify the new feature vector $24_{new}$ according to other feature vectors 24a-n already stored in non-volatile memory 26. If the new feature vector $24_{new}$ can be successfully matched with one of the stored feature vectors 24a-n according to some classification criteria, the current environment for the vehicle 10 is assumed to be the same environment that was used to construct the stored feature vector. The controller 16 can then load a corresponding object configuration for the environment from the set of stored object configurations 25a-n. The controller 16 sends the identified object configuration 25 to the reverse collision avoidance system 12 to assist in determining if detected objects are relevant obstacles.

The object configurations 25a-n for the stored environments include the estimated locations and classifications of static objects 18. Each object configuration is constructed as the vehicle 10 traverses the environment, enabling the camera 14 and sensors 20 to detect the location of objects 18. If a particular environment is visited multiple times, a more accurate object configuration 25 can be constructed. In addition to storing the object configuration 25 for the environment, it would also be possible for the system to store and load the driving path of the vehicle 10.

When the object configuration 25 is sent to the reverse collision avoidance system 12, the classifications of objects 18 from the object configuration 25 can be used to enhance the classification of objects 18 observed by the camera 14 and sensors 20. In addition to assisting in the classification of objects 18, the object configuration 25 can be used to assist in the positioning of objects. With more accurate position and classification information for the objects 18, the collision avoidance system 12 is better able to prevent unnecessary interventions that could be uncomfortable and intrusive to the vehicle occupants.

Each time the vehicle 10 is placed into reverse gear, a new feature vector $24_{new}$ and observed object configuration is recorded. If a matching environment is found when comparing the new feature vector $24_{new}$ and the previous feature vectors 24a-n, the matching environment's feature vector 24a-n and object configuration 25a-n are updated. If a matching environment is not found, the least relevant environment, comprising a feature vector and matching object configuration, is replaced with the new feature vector $24_{new}$ and object configuration $25_{new}$.

The relevance of a stored environment is a measure of both the expectation that the environment will be visited again and the importance of storing the object configuration for that environment. An environment that is commonly encountered and that has an object configuration that causes false interventions from the collision avoidance system 12 would be considered to have a high relevance. The relevance value for an environment could be calculated from any number of properties, such as geographic location, distribution of objects, number of collision avoidance system 12 interventions, number of times the environment has been visited, or the date on which the environment was last visited. An object configuration 25a . . . n that represents an environment that is not often encountered will be eventually overwritten with data from more recent environments as is schematically indicated at 32. This arrangement results in unique environments 25n being removed from the memory 26, to best take advantage of limited storage space.

Various learning algorithms could be used to both determine the relevance of an environment and update the object configuration of an environment. For example, a supervised learning algorithm might take into account the driver's reaction to an intervention from the collision avoidance system 12. If the driver attempts to override the intervention, the system may classify the object that caused the intervention as a non-obstacle. This classification could be saved in the object configuration for future reference to prevent a repeated false activation. Additional learning techniques, such as reinforcement learning, could be employed in cases where the object properties and driver reaction cannot be fully observed.

Since many vehicles 10 perform nearly the same backup operation at the same location many times, the learning algorithm can be utilized to reduce false positives and prevent unnecessary intrusion. Performing the same maneuver repeatedly will only make the system 12 more robust to static objects that could otherwise trigger an intervention (mailbox, tree, etc.). Additionally, newly observed objects that appear in a stored object configuration 25a-n may be more quickly identified as obstacles.

The example systems can utilize the GPS 22 or radio sensors to enhance the learning algorithm for the system 12. The GPS 22 and radio sensors may be optional, or used for confirmation purposes only to account for possible occurrences when a GPS signal is not available.

In one embodiment, a method of employing the reverse collision avoidance system 12 includes detecting a plurality of objects proximate to a vehicle with at least one sensor 20, when the vehicle 10 is placed in a reverse drive gear.

The controller 16 for the collision avoidance system 12 determines a current feature vector 24 based on relationships among data provided by the at least one sensor. The current feature vector 24 is stored in non-volatile memory 26 for the collision avoidance system 12. The current feature vector $24_{new}$ is also compared to other feature vectors 24a-n previously stored in the memory 26 to determine if the current feature vector $24_{new}$ matches any of the previous feature vectors 24a-n. Based upon a match between the current feature vector $24_{new}$ and a previous feature vector 24a-n, an associated object configuration 25a-n can be loaded. By matching sensor-observed objects with objects in the object configuration, the collision avoidance system 12 can more accurately determine the probability that a detected object 18 is a relevant obstacle. A warning is provided to the driver when a relevant obstacle is detected and at least one vehicle collision avoidance action is also provided when the probability that the object is determined to be an obstacle that will result in a collision exceeds a predetermined threshold.

Accordingly, the disclosed system and method stores and utilizes past determinations of feature vectors and obstacle characteristics to speed determinations and eliminate repeated misclassification of commonly encountered obstacles.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A reverse collision avoidance system for a vehicle comprising:
at least one sensor mounted to the vehicle to detect objects proximate to a path of the vehicle;
a controller including instructions for:
analyzing data from the sensors to determine a current feature vector based upon data from the at least one sensor;
storing the current feature vector and associated object configuration for the environment in non-volatile memory for the collision avoidance system;

comparing the current feature vector with previously stored feature vectors; and selecting an object configuration representing the environment surrounding the vehicle based on the comparison of the current feature vectors with previously stored feature vectors, wherein the probability that the detected object is an obstacle is decreased when the current feature vector is matched to a previous feature vector and the detected object was previously identified as not an obstacle.

2. The reverse collision avoidance system of claim 1, wherein the controller includes instructions for:

comparing the current feature vector to previous feature vectors stored in a memory to determine similarities between the current feature vector and any of the previous feature vectors; and selecting the object configuration from stored object configurations that corresponds with a previous feature vector that matches the current feature vector.

3. The reverse collision avoidance system of claim 1, wherein the controller further includes instructions for determining a probability of collision with the detected object.

4. A reverse collision avoidance system for a vehicle comprising:

at least one sensor mounted to the vehicle to detect objects proximate to a path of the vehicle;

a controller including instructions for:

analyzing data from the sensors to determine a current feature vector based upon data from the at least on sensor;

storing the current feature vector and associated object configuration for the environment in non-volatile memory for the collision avoidance system;

comparing the current feature vector with previously stored feature vectors; and selecting an object configuration representing the environment surrounding the vehicle based on the comparison of the current feature vectors with previously stored feature vectors, wherein when a previous feature vector is determined to be a match with a current feature vector, a relevance value for the previous feature vector is increased.

5. The reverse collision avoidance system as recited in claim 1, wherein the current feature vector comprises a relationship between proximate objects.

6. The reverse collision avoidance system as recited in claim 1, wherein the at least one sensor comprises a camera mounted within the vehicle.

7. The reverse collision avoidance system as recited in claim 1, wherein the at least one sensor comprises a proximity sensor mounted to the vehicle.

8. A collision avoidance system for a vehicle comprising:

at least one sensor mounted to the vehicle to view a vehicle path for the vehicle;

a controller which analyzes data from the sensors to determine a current feature vector based upon relationships among data detected by the at least one sensor; and a non-volatile memory which stores the current feature vector and associated object configuration in the collision avoidance system, wherein a probability that an object is an obstacle within the vehicle path is modified based upon a comparison between the current feature vector and a previous feature vector and an object configuration that corresponds with the previous feature vector, wherein the probability that the object is an obstacle to be avoided is decreased when the current feature vector is matched to a previous feature vector and the object was previously identified as not an obstacle, and wherein the controller is configured to select an object configuration representing the environment surrounding the vehicle based on the comparison of the current feature vectors with previously stored feature vectors, wherein the probability that the detected object is an obstacle is decreased when the current feature vector is matched to a previous feature vector and the detected object was previously identified as not an obstacle.

9. The collision avoidance system as recited in claim 8, wherein, the controller compares the current feature vector to previous feature vectors stored in the memory to determine if the current feature vector includes similar characteristics with any of the previous feature vectors.

10. The collision avoidance system of claim 8, wherein the at least one sensor includes a camera which provides a view of the vehicle path, wherein the controller analyzes an image from the camera to identify objects proximate to the vehicle.

11. The collision avoidance system of claim 8, wherein the at least one sensor comprises a proximity sensor.

12. A collision avoidance system for a vehicle comprising:

at least one sensor mounted to the vehicle to view a vehicle path for the vehicle;

a controller which analyzes data from the sensors to determine a current feature vector based upon relationships among data detected by the at least one sensor; and a non-volatile memory which stores the current feature vector and associated object configuration in the collision avoidance system, wherein a probability that an object is an obstacle within the vehicle path is modified based upon a comparison between the current feature vector and a previous feature vector and an object configuration that corresponds with the previous feature vector, wherein when a previous feature vector is determined to be a match with a current feature vector, a relevance value for the previous feature vector is increased, and wherein the controller is configured to select an object configuration representing the environment surrounding the vehicle based on the comparison of the current feature vectors with previously stored feature vectors, wherein the probability that the detected object is an obstacle is decreased when the current feature vector is matched to a previous feature vector and the detected object was previously identified as not an obstacle.

13. A method of avoiding a collision while operating a vehicle in reverse comprising:

detecting a plurality of objects proximate to a vehicle with at least one sensor, when the vehicle is placed in a reverse drive gear;

analyzing data from the sensors with a controller for a collision avoidance system to determine a current feature vector based upon relationships among data from the at least one sensor;

storing the current feature vector in non-volatile memory for the collision avoidance system;

selecting an object configuration representing the environment surrounding the vehicle based on the comparison of the current feature vector with previously stored feature vectors, comparing the current feature vector to previous feature vectors stored in the memory to determine if the current feature vector matches any of the previous feature vectors;

modifying the probability that an object is an obstacle based upon a match between the current feature vector and a previous feature vector, including decreasing the probability that the object is an obstacle when the current feature vector is matched to a previous feature vector and the object was previously identified as not an obstacle; and providing at least one vehicle collision avoidance action when the probability that the object is determined to be an obstacle exceeds a predetermined threshold.

14. The method of claim 13, further comprising determining a probability of collision with the obstacle, and providing at least one vehicle collision avoidance action when the probability that the object is determined to be an obstacle that requires avoidance exceeds a predetermined threshold and when the probability of collision exceeds a predetermined collision threshold.

15. The method of claim 13, further comprising increasing a relevance value for a previous feature vector every time that previous feature vector is determined to be a match to the current feature vector.

* * * * *